United States Patent [19]

Fernandez et al.

[11] Patent Number: 5,570,450
[45] Date of Patent: Oct. 29, 1996

[54] JUNCTION AND MODULAR OPTICAL SHARING TERMINAL ASSEMBLY

[75] Inventors: Manuel F. Fernandez; Jesus D. Cortijo, both of Madrid, Spain

[73] Assignee: Telefonica De España, S.A., Madrid, Spain

[21] Appl. No.: 288,714

[22] Filed: Aug. 15, 1994

Related U.S. Application Data

[63] Continuation of Ser. No. 987,705, Dec. 9, 1992, abandoned.

[30] Foreign Application Priority Data

Dec. 12, 1991 [ES] Spain ..................................... 9103757

[51] Int. Cl.$^6$ ..................................................... G02B 6/36
[52] U.S. Cl. .......................... 385/135; 385/137; 385/134
[58] Field of Search ..................................... 385/134–139

[56] References Cited

U.S. PATENT DOCUMENTS

| | | | |
|---|---|---|---|
| 5,024,498 | 6/1991 | Becker et al. | 385/134 X |
| 5,100,221 | 3/1992 | Carney et al. | 385/135 |
| 5,142,606 | 8/1992 | Carney et al. | 385/134 |
| 5,201,484 | 4/1993 | Thoen | 248/68.1 |
| 5,339,379 | 8/1994 | Kutsch et al. | 385/135 |

*Primary Examiner*—John D. Lee
*Assistant Examiner*—Phan T. H. Palmer
*Attorney, Agent, or Firm*—Popham, Haik, Schnobrich & Kaufman, Ltd.

[57] ABSTRACT

A junction and modular optical sharing terminal assembly incorporates a vertically-extending frame having a plurality of frame plates vertically mounted thereon and a plurality of horizontally-extending, telescopic tray guides mounted on the frame plates and which are movable between a retracted position and a horizontally-extended position. Horizontal tray modules rest on the tray guides and are movable between a retracted position and a horizontally-extended position. The tray modules include warehousing, junction, and connector trays, each having identical perimeters and terminating at their sides with identical anchoring bands which removably rest on the tray guides, and each including a molded part at its front edge. A resilient trigger band is mounted on each of the anchoring bands, and interacts with the molded part and the tray guides to lock the tray modules in their extended and retracted positions. A housing encloses the frame, the frame plates, the tray guides, and the tray modules. The housing also encloses a plurality of inner frame sides which are mounted on the frame, a plurality of cable guides positioned at different heights on the inner frame sides for carrying and guiding access cables, and a plurality of adjacent, modular split flanges for receiving access cables.

6 Claims, 9 Drawing Sheets

JUNCTION AND MODULAR OPTICAL SHARING TERMINAL ASSEMBLY

This application is a continuation of U.S. Patent application Ser. No. 07/987,705, filed Dec. 9, 1992 (abandoned).

BACKGROUND OF THE INVENTION

1. Field of the Invention

This invention finds its application in the telecommunications field and, specifically, is to be used in the substructure of an outside plant necessary for creating and maintaining an optical fiber.

2. Related Art

At present, several junction and modular optical sharing assemblies are know, all of them manufactured and designed to allow the housing of junctions, connectors and optical cable.

Nevertheless, all assemblies known until now are unable to exchange the several trays configuring several junction module trays, optical sharer trays and warehousing trays, for which reason, in view of the need of installing a small number of connectors, it is imperative to install three full modules.

Also, they do not allow easy access when it is necessary to replace different components of the plant to carry out several installation and maintenance operations thereof.

A solution to this problem would be to rely on a junction and modular optical sharing terminal assembly, in which the several junction modules, connectors and storage could make use of elemental units, in such a way that they could permit interchangeability and the ability to distinguish the module by the units constituting it, this is, whether they are specifically junction and sharing or warehousing units, and each module can be formed by different trays, according to the needs of the optical fiber plant.

Also, if a terminal assembly fitted with these features is employed, the arrangement would allow the installation of a single module having different types of trays and, so, to meet the need of a low capacity of connectors and junctions.

It has been confirmed that, in relation to the problem of access during different installation and maintenance operations, the solution would be to remove the side partitions in the modules impeding displacements, providing free access to the different cables already or to be installed.

Nevertheless, up to now, no junction and modular optical-sharing assembly fitted with the features as pointed out as suitable.

SUMMARY OF THE INVENTION

The junction and modular optical sharing terminal assembly proposed by this invention constitutes itself a clear solution to the above-mentioned problem, which satisfactorily covers the mentioned needs, and evidences a substantial improvement in the state of the art due to its embodiment.

In a more definite way, the junction and modular optical-sharing terminal assembly of the invention is composed of a vertical frame housing and retaining a set of frame-plates, each of which supports, in turn, several trays by means of its corresponding tray guides.

The assembly has an envelope covering the side parts, and the bottom receives the vertical frame.

The junction, connector and warehouse trays are of the same dimensions, their extremities ending at the same profile or anchorage band resting on some guides which are also identical for the three types of junction, connector and warehousing trays.

Owing to the above-mentioned, it will be appreciated that all the trays are interchangeable at any of the housings applied inasmuch as height, so enabling to adapt the assembly to every specific use.

These trays have, at their front side, a molded part allowing:

- housing of the cards while showing the Contents and use of the tray;
- plugging of the space left between trays and corresponding to the vertical separation of same;
- resilient trigger-bands to lock the tray in the extreme positions of its travel.

The trays rest on telescopic guides, so that they can be pulled out and locked in their extreme positions by means of a trigger-band system, by which the access to different trays is indistincly obtained at both sides simultaneously, or at the front or back.

The junction tray allows the housing of junctions and the fiber which corresponds thereto, and also is capable of doubling its storage capacity under particular situations.

The tray for the connectors has a detachable coupler-holder, allowing it to be replaced by the corresponding one of the connectors to be used.

The warehousing tray allows the housing of flexible or monofiber cable in independent areas, so obtaining an optimum identification of the different cables.

On the upper or lower part depending on the cable access to the assembly, there are arranged split flanges fixing the necessary cable pairs.

On the outside and intermediate sides, them are arranged some parts for suitably guiding the different cables located in the assembly.

Also, the assembly has two intermediate sides located in the upper or lower inner middle part the sharer, depending on the access to the cables, at the high or low zone, and parallel to the outer sides, so allowing the provision of independent side spaces in order to optimize the arrangement and distribution of the different cables arriving at same.

The assembly has three large doors and two smaller ones, pivoting on each side, these doors serving to close both front voids left along and vertically between the center zone occupied by the trays and the sharer sides.

When the doors open, the access to they permit optical fiber cables, these cables being housed in these sides, as well as the removal of the trays on which they rest.

The assembly is mounted on an undeformable lower frame which has four adjustable legs which are located at the corners thereof, so allowing a later correct levelling of the sharer.

Lastly, the assembly is fitted with a second frame having a "U" shape, topping the upper zone of the assembly without hampering the easy access of all cables inside the sharer.

BRIEF DESCRIPTION OF THE DRAWINGS

In order to complement the present description and to aid to a better understanding of the characteristics of the invention, the appended drawings which form a part of this specification, show, by way of illustrative and non-limiting example, the following figures.

DETAILED DESCRIPTION OF THE PREFERRED EMBODIMENTS

In view of those Figures, it can be seen that the junction and modular optical sharing terminal assembly (1), which is the object of the invention, comprises a vertical frame (12) housing and locking a set of frame-plates (8), each of which support several trays (3), by means of their respective tray guides (9).

All the junction (5), warehousing (6) and connector (7) trays have identical dimensions, their extremities ending at the same profile or anchoring band (10) resting on tray guides (9), also identical for the three types of junction (5), warehousing (6) and connector (7) trays.

Due to the above described structure, it is possible to exchange these trays.

Figure 15:
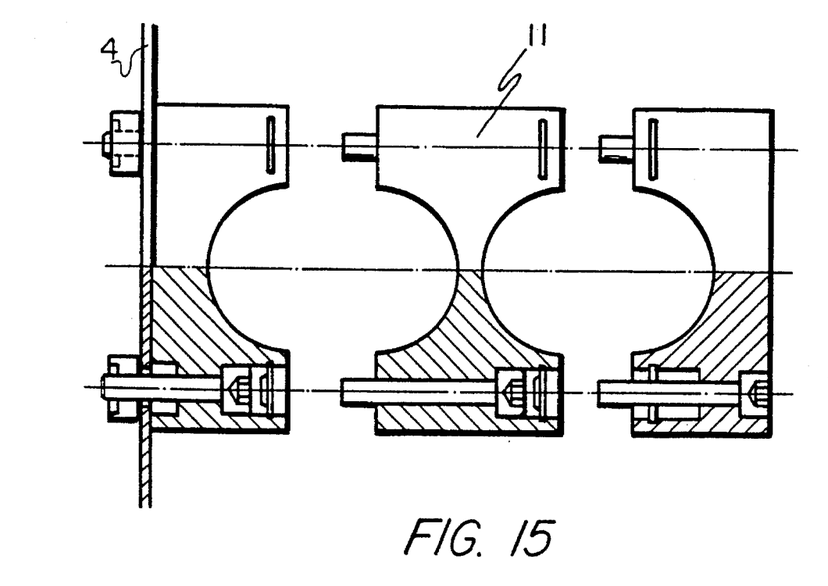
FIG. 15 shows a view of the split flange allowing the housing of different cables.

On the upper zone and due to the fact that the access of cables to the assembly is located on this side, three split flanges (11) are arranged, in order to allow the fixing of the necessary access cable pairs.

Figure 16:
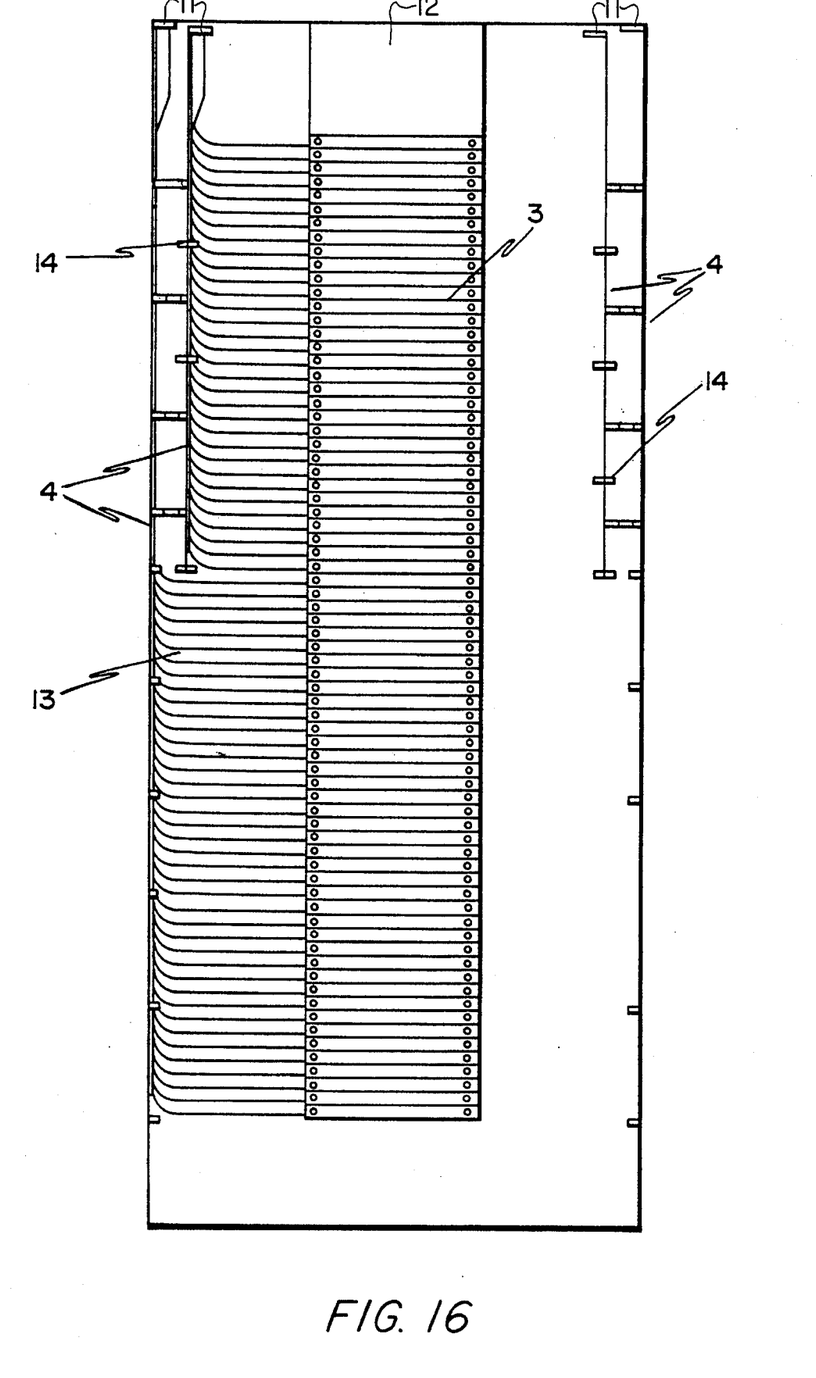
FIG. 16 shows, a view of the supporting structure of trays, as well of the wiring distribution system with the gap of access cables at two heights.

On the outer and intermediate sides, parts (14) are arranged for adequately guiding the different cables arriving at same.

Figure 9:
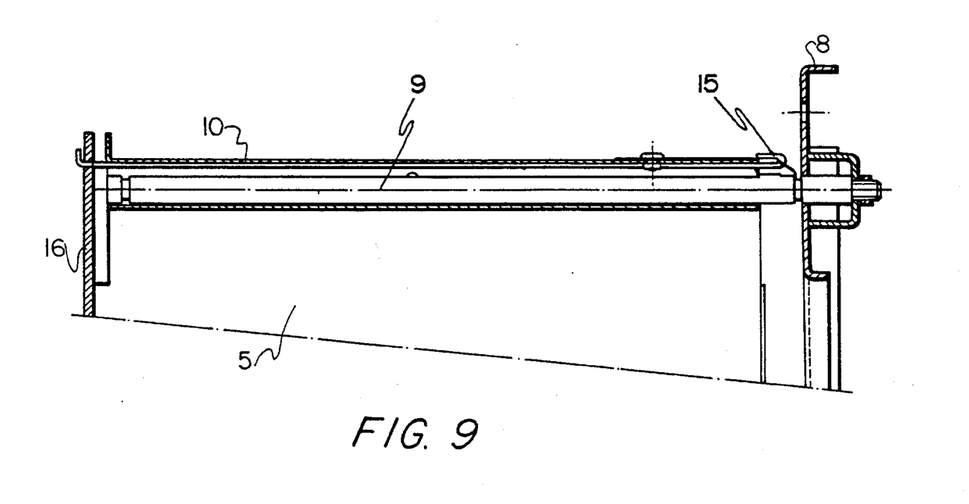
FIG. 9 shows a fragentary view of the tray guide and the trigger band, as well as the telescopic nature of same, the other side being a mirror image thereof, together with the locking and removal system of same.
Figure 10:
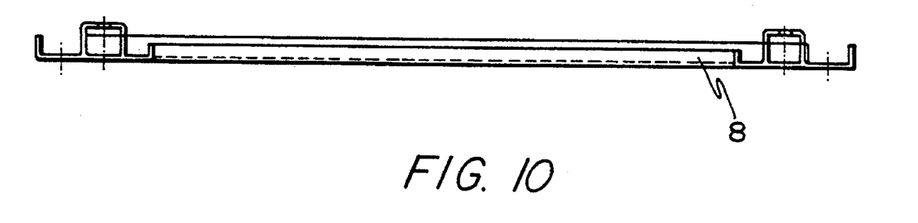
FIG. 10 shows an elevational view of the supporting plate on which the several tray guides are incorporated.
Figure 11:
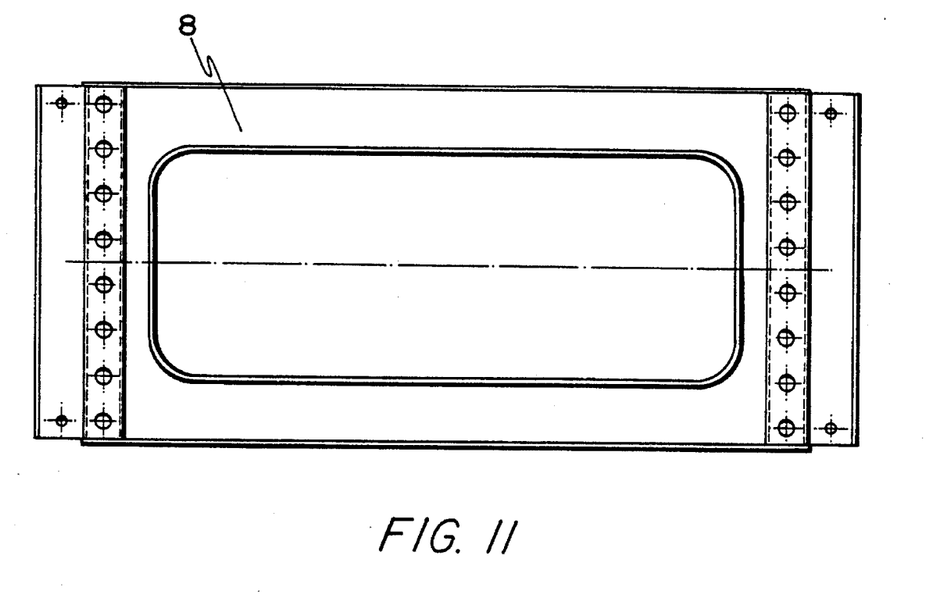
FIG. 11 shows a plan view of the supporting plate shown in FIG. 10.
Figure 12:
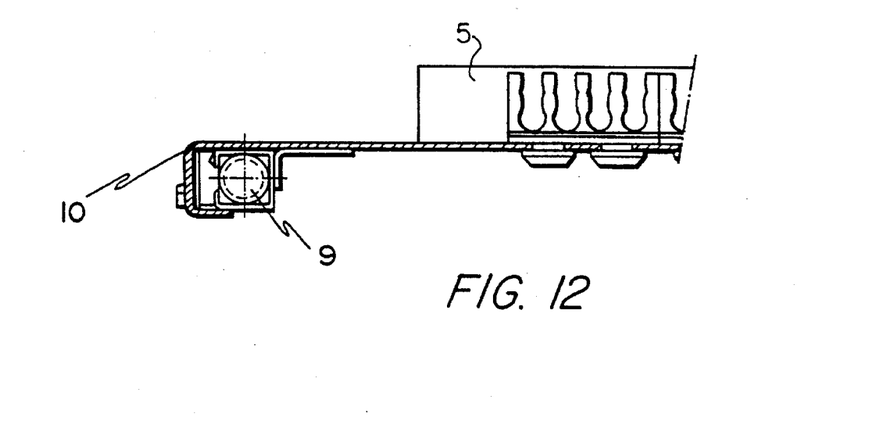
FIG. 12 shows a partial front elevational view, partially in cross-section, of the junction tray of FIG. 2 mounted on a telescopic tray guide.
Figure 13:
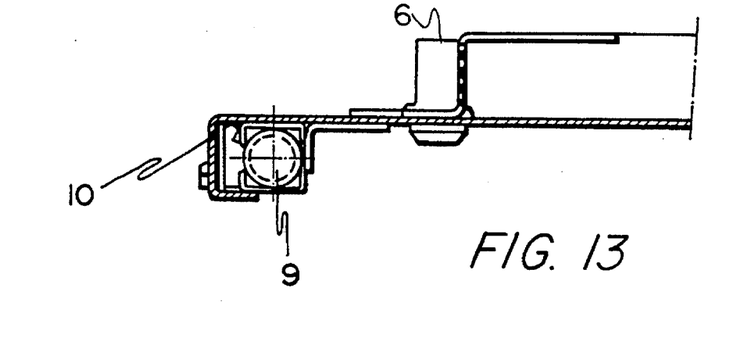
FIG. 13 shows a partial front elevational view, partially in cross-section, of the warehousing tray of FIG. 4 mounted on a telescopic tray guide.
Figure 14:
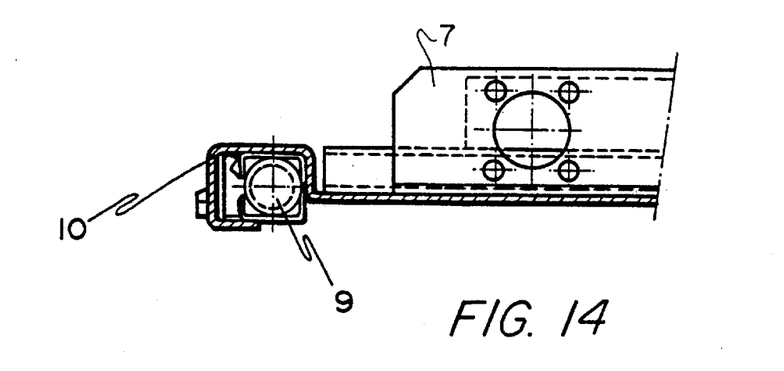
FIG. 14 shows a partial front elevational view, partially in cross-section, of the connector tray of FIG. 6 mounted on a telescopic tray guide.
Figure 17:
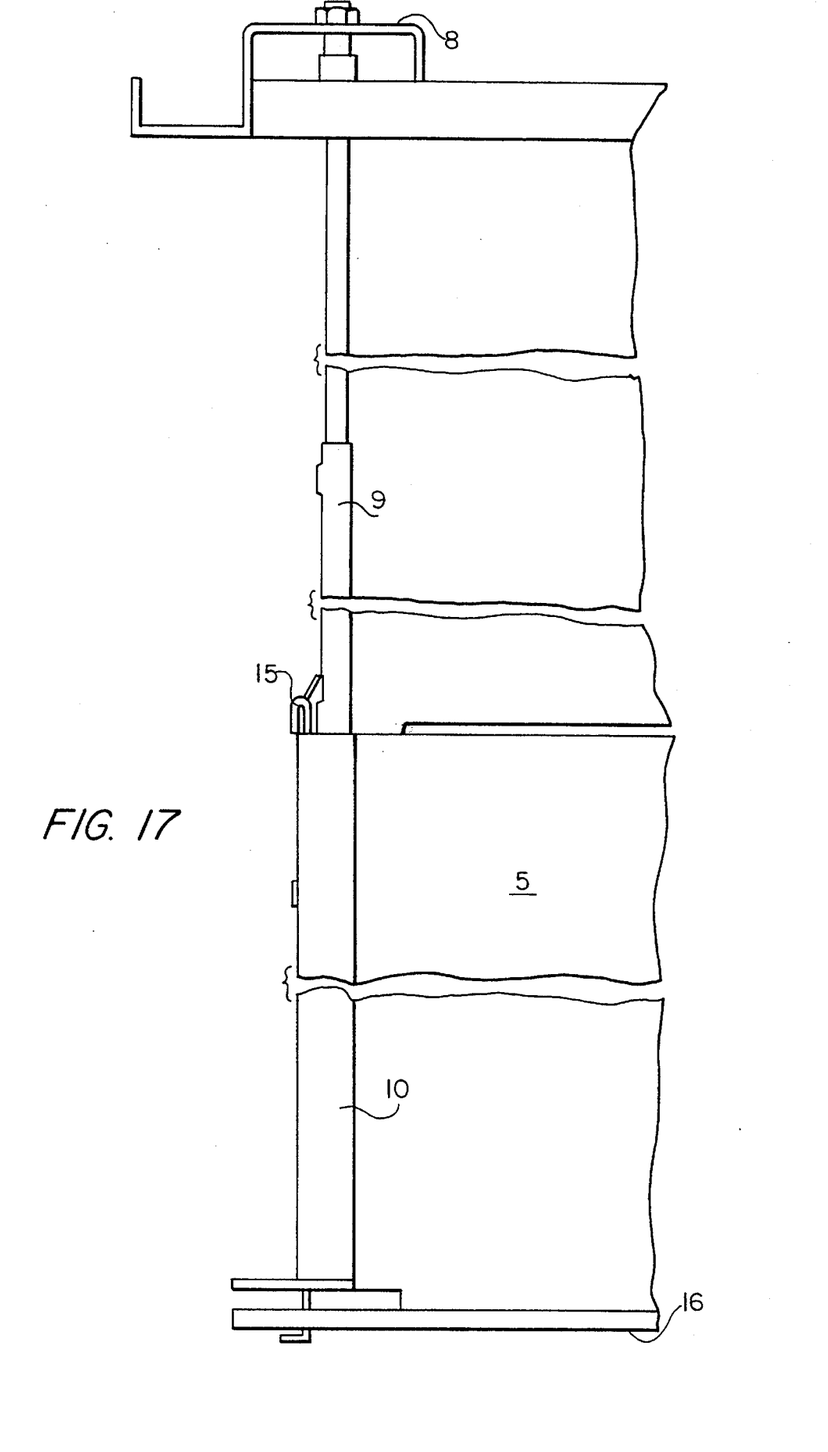
FIG. 17 is a fragmentary plan view of a storage tray on its telescopic guides, in its extracted position, the opposite being a mirror image thereof.

These trays are removably installed on telescopic guides (9), and are capped at their front edge by a molded part 16 having flexible ends. Resilient trigger-bands (15) at one end releasably engage molded part (16) and at the other end releasably engage telescopic guides (9), locking the tray in extreme positions of its travel.

Figure 4:
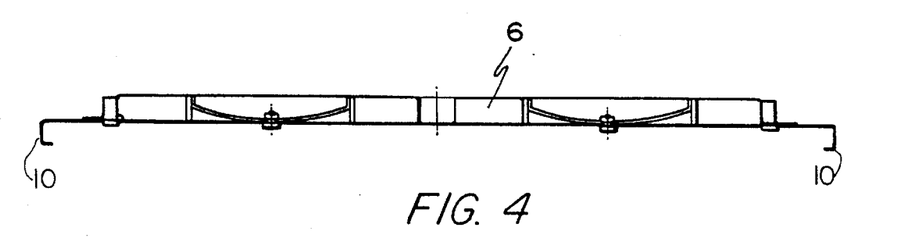
FIG. 4 shows an elevational view of the front side of a warehousing tray.
Figure 5:
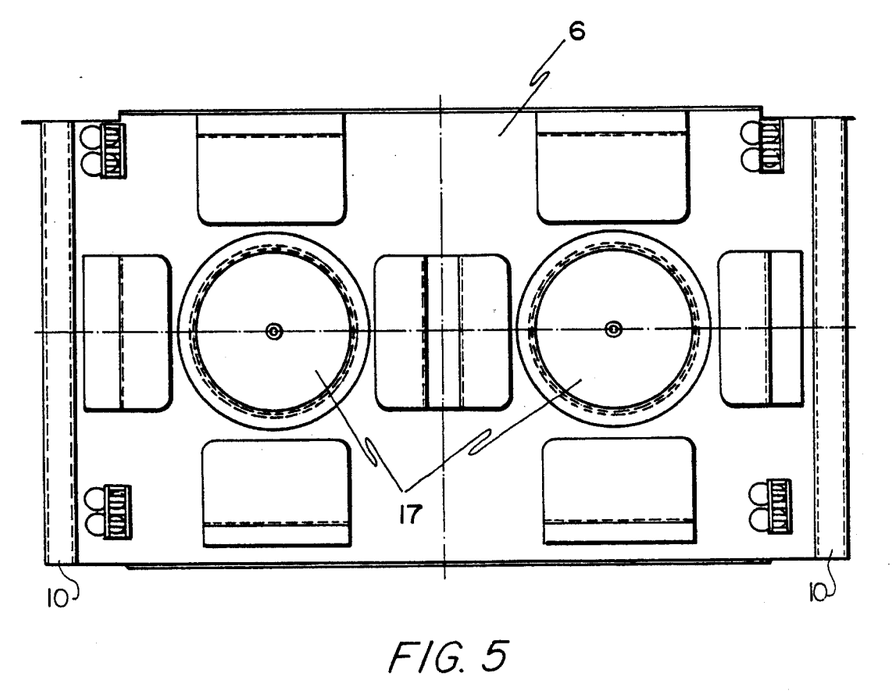
FIG. 5 shows a plan view of the warehousing tray shown in FIG. 4.
Figure 6:
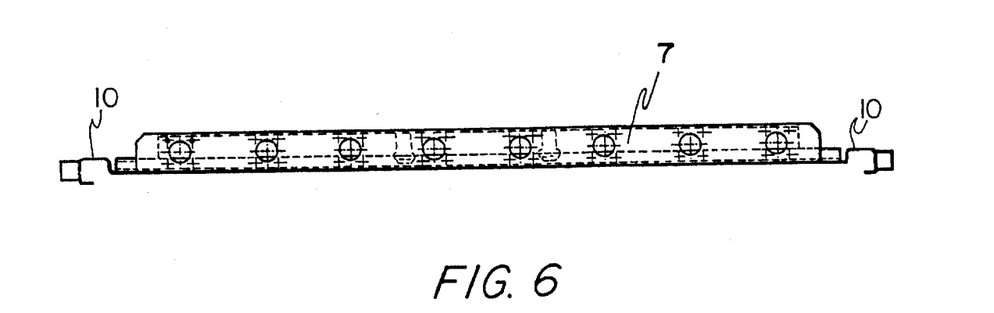
FIG. 6 shows an elevational view of the front side of a connector tray.
Figure 7:
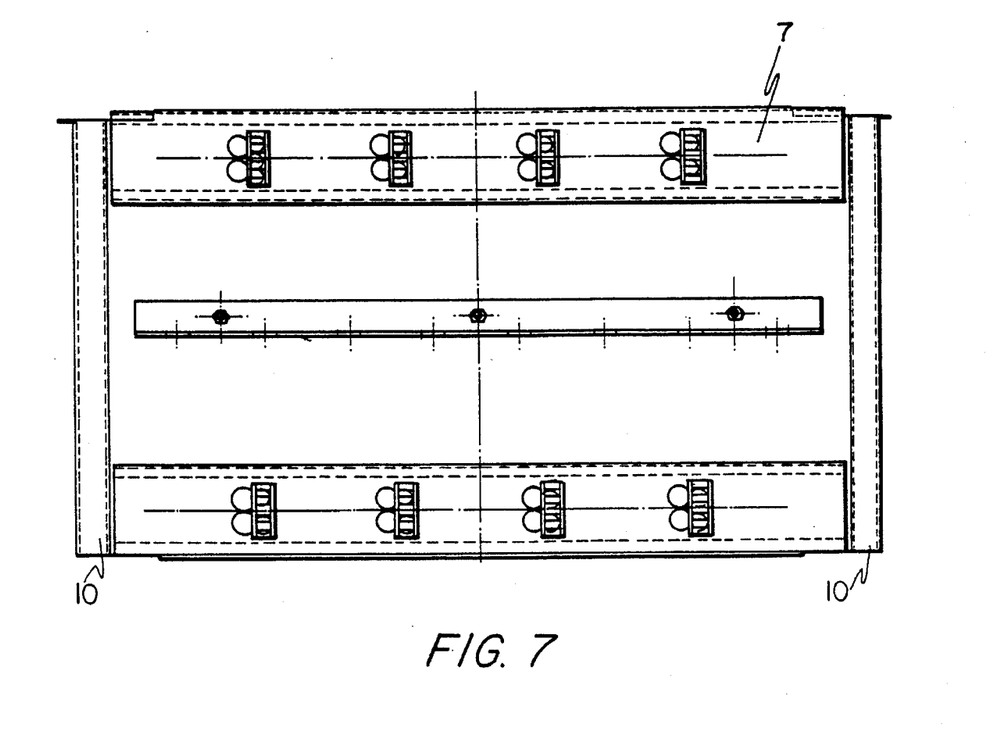
FIG. 7 shows a plan view of the connector tray shown in FIG. 6.
Figure 8:
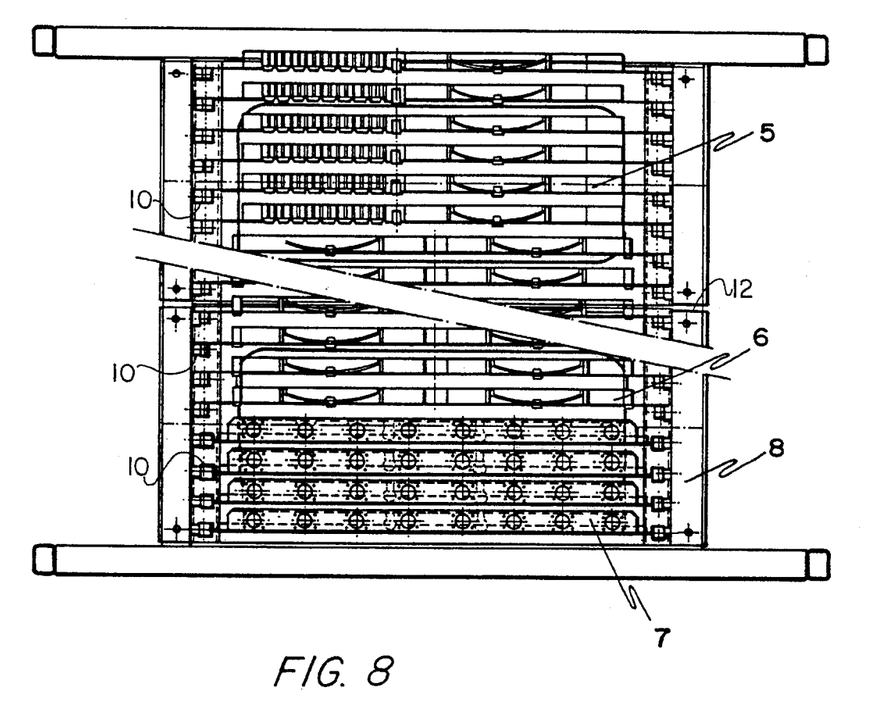
FIG. 8 shows a view of the frame with one of the possible multiple arrangements of trays.

The warehousing tray allows the housing of flexible or monofiber cables in independent zones (17), so obtaining an optimal identification of the different cables.

Figure 1:
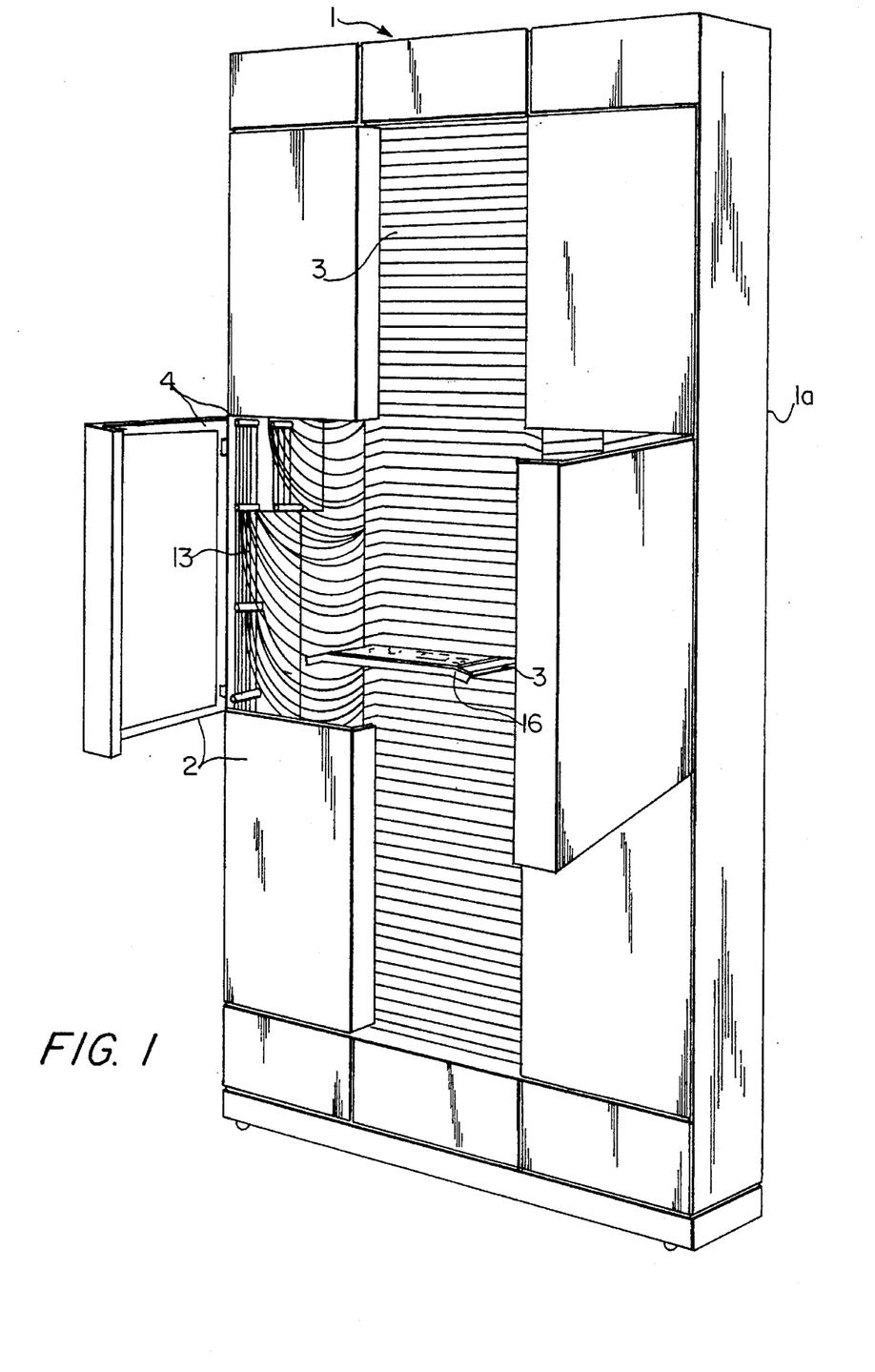
FIG. 1 is a full perspective view of the junction and modular optical sharing terminal assembly, which is the object of the present invention, showing the inner arrangement of same.
Figure 2:
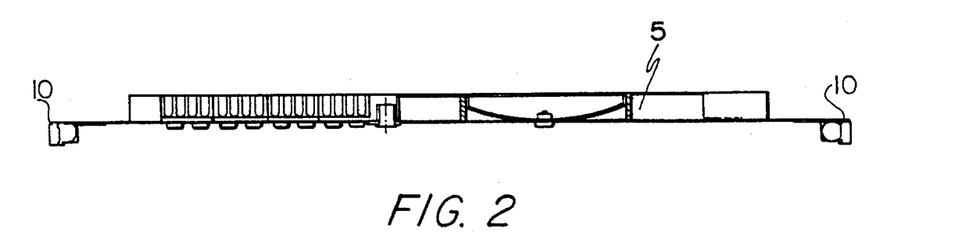
FIG. 2 shows an elevational view of the front side of a junction tray.
Figure 3:
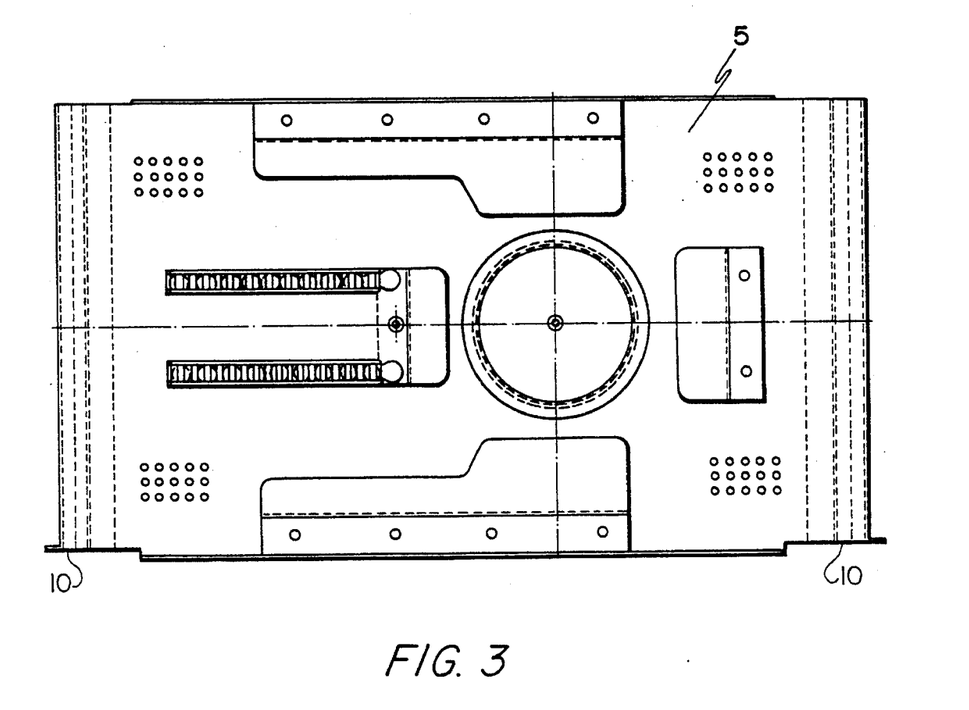
FIG. 3 shows a plan view of the junction tray shown in FIG. 2.

The assembly has three large doors (2) and two smaller pivoting on each of sides.

These large doors (2) close two front voids located along and vertically between the center zone occupied by the trays and the sides of sharer.

When the doors open, access is gained to the optical fiber cables 13, these cables being housed in these sides, and tray (3) on which they rest can be removed.

It is not considered necessary to extend this description for any expert in the art to understand the scope of the invention and the advantages derived from it.

The materials, size, shape and arrangement of its components will be open to variation, provided that it does not imply any alteration to the essence of the invention.

The terms under which this specification has been described should be always taken in an ample and non-limitative sense.

We claim:

1. A junction and modular optical sharing terminal assembly comprising:

a vertically-extending frame;

a plurality of frame plates vertically mounted on said frame;

a plurality of horizontally-extending tray guides mounted on said frame plates, said tray guides being telescopic and being movable between a retracted position and a horizontally-extended position;

a plurality of horizontal tray modules movable between a retracted position and a horizontally-extended position, said tray modules comprising warehousing, junction, and connector trays, each of said tray modules having identical perimeters and having formed along opposite sides thereof identical anchoring bands, said anchoring bands removably resting on said tray guides;

a housing enclosing said frame, said frame plates, said tray guides, and said tray modules; and a resilient trigger band mounted on each of said anchoring bands, said trigger bands releasably engaging said tray guides in said extended and retracted positions to lock said tray modules in said extended and retracted positions, respectively.

2. The assembly of claim 1, wherein said tray modules are spaced apart to define spaces therebetween, said tray modules including molded parts at front portions thereof, said molded parts extending vertically to fill spaces between said tray modules, and said trigger bands also releasably engaging said molded parts.

3. The assembly of claim 1, wherein said assembly further comprises a plurality of adjacent, modular split flanges enclosed in said housing for receiving access cables.

4. The assembly of claim 1, wherein said assembly further comprises a plurality of inner frame sides enclosed within said housing and mounted on said frame, and a plurality of cable guides positioned at different heights on said inner frame sides for carrying and guiding access cables.

5. The assembly of claim 4, wherein said inner frame sides are positioned at an upper half of said frame.

6. The assembly of claim 4, wherein said inner frame sides are positioned at a lower half of said frame.

* * * * *